(No Model.) 2 Sheets—Sheet 1.
S. R. DRESSER.
REPAIR DEVICE FOR STOPPING LEAKY JOINTS.
No. 571,220. Patented Nov. 10, 1896.
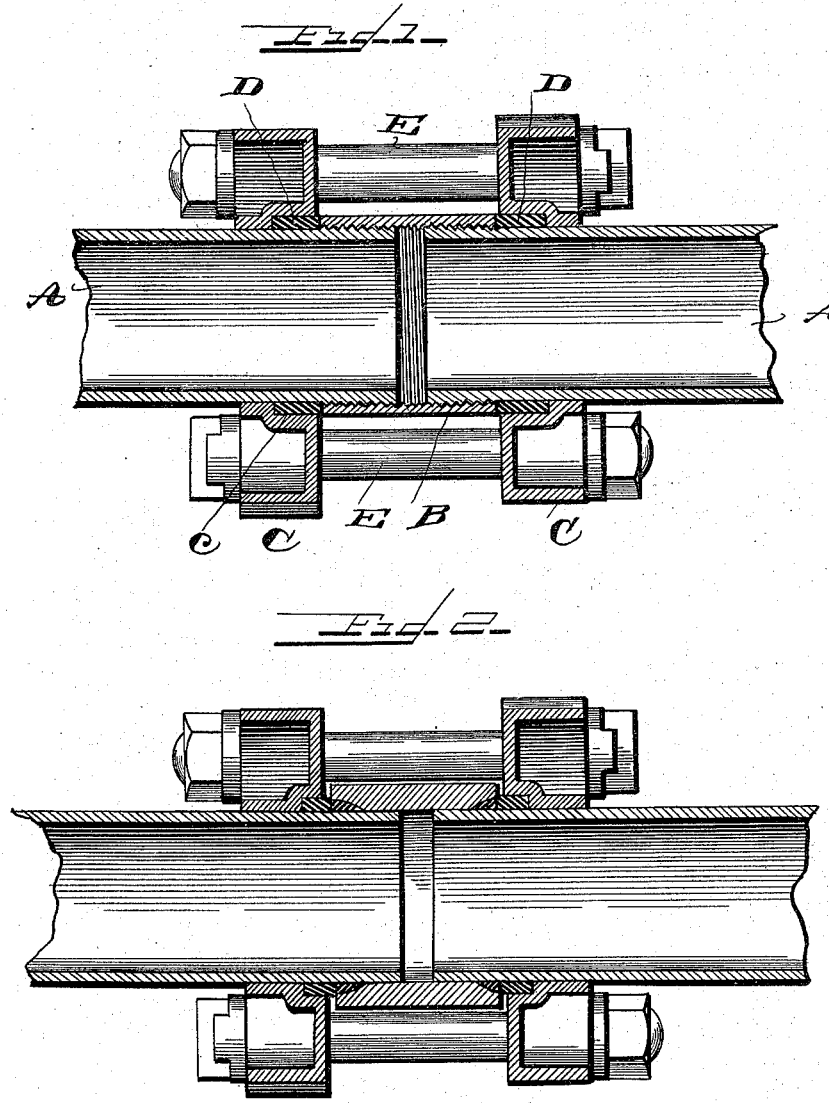
Witnesses
G. A. Tauberschmidt,
J. D. Kingsbury.
Inventor
Solomon R. Dresser
By Whitaker & Prevost
Attys.

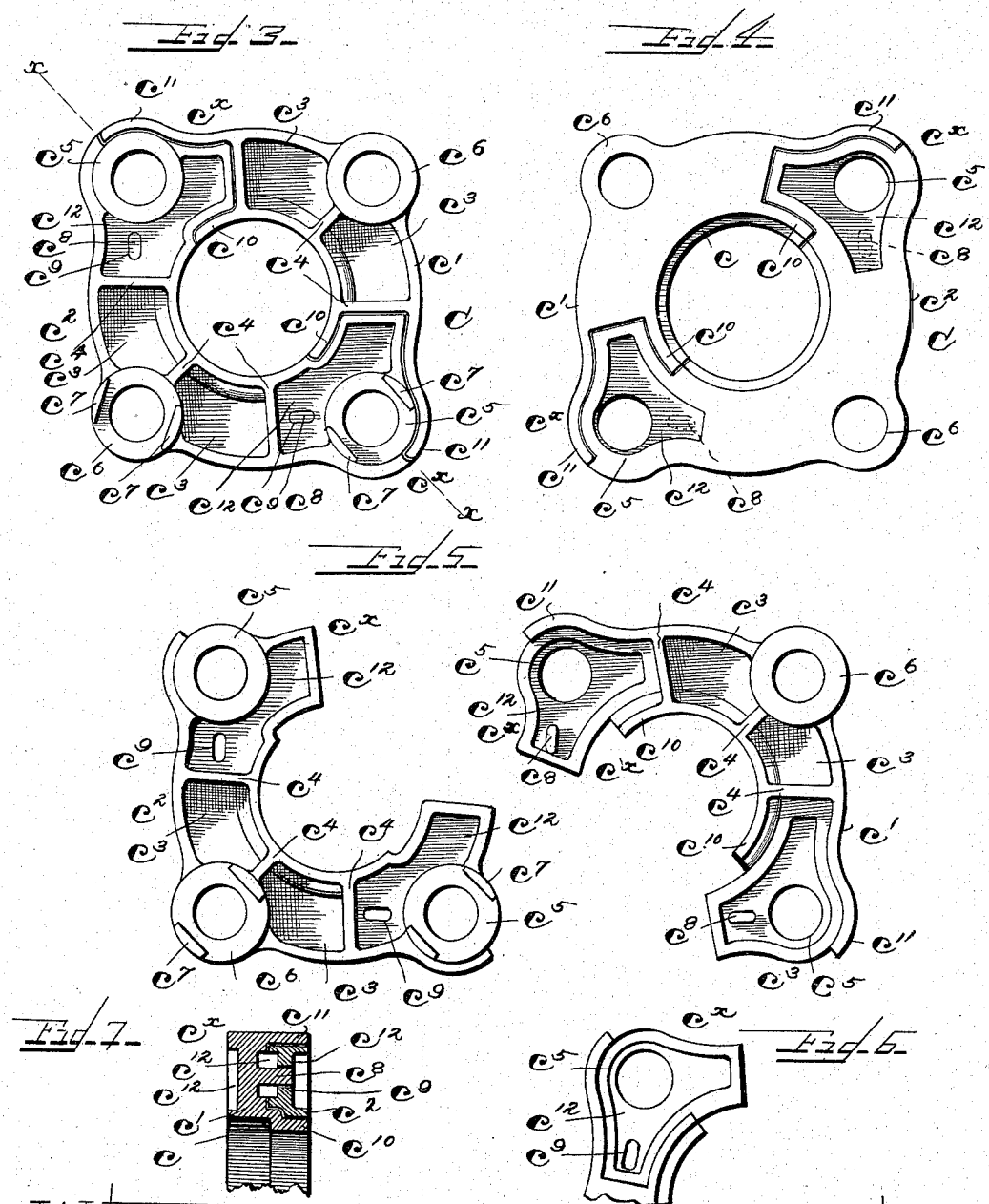

UNITED STATES PATENT OFFICE.

SOLOMON R. DRESSER, OF BRADFORD, PENNSYLVANIA.

REPAIR DEVICE FOR STOPPING LEAKY JOINTS.

SPECIFICATION forming part of Letters Patent No. 571,220, dated November 10, 1896.

Application filed April 14, 1896. Serial No. 587,524. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Repair Devices for Stopping Leaky Joints; and I do hereby declare the following to be a full, clear, and exact description of the invention, such as will enable others skilled in the art to which it appertains to make and use the same.

My invention consists in the novel features hereinafter fully described, reference being had to the accompanying drawings, which illustrate one form in which I have contemplated embodying my invention, said invention being fully disclosed in the following description and claims.

Referring to the said drawings, Figure 1 represents a sectional view of two pipe-sections connected by a thimble and having my improved repair device applied thereto. Fig. 2 is a similar view showing my repair device applied to a leaded joint. Fig. 3 is a plan view of the outer side of one of the sectional clamping-rings. Fig. 4 is a similar view showing the other side of the ring. Fig. 5 is a view similar to Fig. 3, showing the sections of the ring separated. Fig. 6 is a detail view showing the inner side of one of the stepped portions of the left-hand ring in Fig. 5. Fig. 7 is a detail sectional view through the stepped ends of one of said rings.

The object of my invention is to provide a repair device which can be applied to the joints of pipes for conveying oil, gas, or other fluid, to stop leaks therein without removing the pipe or disturbing the joints in any way; and it consists of a pair of clamping-rings of peculiar construction, provided each with an annular recess to receive a packing-ring, and clamping-bolts which draw the rings together and force the packing up against the ends of the joint.

In the drawings, A A represent the meeting ends of two sections of pipe secured together by a screw-threaded union B.

C C represent the clamping-rings, each of which is provided with an annular recess $c$, slightly larger in diameter than the union B, to receive a packing-ring D, and E E represent the clamping-bolts for drawing the clamping-rings together and clamping the packing-rings D against the ends of the union B and compressing them between the ends of the union and the bottom and sides of the recesses $c$.

Each of the clamping-rings C is composed of two parts $c'$ and $c^2$, as shown in Figs. 3, 4, and 5, each having stepped end portions $c^\times$ to engage the stepped portions of the other part. The portions of each ring-section between the ends are cored out, as shown at $c^3$ $c^3$, preferably forming deep recesses, thus forming inner and outer walls, which are connected by one or more radially-disposed flanges $c^4$, as shown. The stepped end portions of the sections are provided with bolt-holes $c^5$, adapted to register when the parts are placed together, and intermediate its ends each section is provided with one or more bolt-holes $c^6$, according to the size of the ring, one being shown.

Each ring is provided adjacent to two or more of its holes, as shown, with retaining-lugs $c^7$ $c^7$ for engaging the sides of the heads of the bolts to prevent them from turning while the nuts are being screwed on, and these lugs are so arranged that in placing two rings in position, as shown in Fig. 1, the bolt-holes of one ring which have these projections will not be in line with the similarly-provided bolt-holes of the other ring. Thus part of the bolts will be inserted in one direction and part in the other direction, enabling two operators on opposite sides of the pipe to work simultaneously and conveniently in tightening up the nuts, thus saving considerable time in putting the repair devices in place. Each ring-section is provided with a solid annular wall surrounding the bolt-holes, which are provided intermediate the ends of the sections, said walls extending the entire thickness of the ring and projecting slightly beyond the outer face of the ring, as shown in Figs. 1 and 2, to form a bearing for the bolt-head or nut. This construction gives great strength where it is particularly needed, adjacent to the bolt-holes.

In order to hold the two sections of each ring together when placed around a pipe before the bolts are inserted, I provide each of the stepped ends of one ring-section (in this instance $c'$) with a securing-lug $c^8$, eccentric to the bolt-hole, (see Figs. 5 and 6,) said lugs being adapted to engage corresponding apertures $c^9$ in the stepped end portions of the other ring-section. (See Figs. 3, 4, 5, and 6.) By means of this construction the parts of each ring can be placed around a pipe without disturbing either the pipe or the joint and held temporarily by interlocking said lugs $c^8$ and apertures $c^9$ until the bolts are inserted and tightened up.

In the practical manufacture and use of sectional clamping-rings having stepped ends it has been found that they frequently break adjacent to the point where the stepped portion joins the thicker portion of the section, and this tendency has prevented very largely the wider use of sectional rings, because they did not possess sufficient strength at these points to stand the strains to which they were subjected. I avoid this difficulty entirely in the following manner: Each of the stepped ends is provided on the side which is cut away with an inner strengthening web or flange $c^{10}$, forming a continuation of the inner wall of the ring and an outer strengthening web or flange $c^{11}$. (See Figs. 3, 4, 5, 6, and 7.) These walls extend from the point where the stepped portion begins to the median line of separation of the two ring-sections, in this instance a line drawn through the centers of the bolt-holes of the stepped portions, as indicated by the dotted lines $x$ $x$ in Fig. 3. It will be seen that these flanges strengthen the stepped portions of the ring-sections both interiorly and exteriorly, and it is practically impossible to break the stepped portions of the rings.

In addition to the cored portions of the rings each ring-section is slightly recessed or cored, as indicated at $c^{12}$, throughout the parts where, on account of the overlapping or stepped portions, the deep covering cannot be resorted to, thus further lightening the construction. By coring out the rings, as described, they can be made about one-half the weight that has been required heretofore, and the cost of manufacture is thus greatly reduced, while the strength of the rings is even greater by reason of the reinforcing or strengthening walls of the stepped portions. As many of these rings are made to fit pipe of very large diameter, this decrease in cost and the ease of handling resulting from the decreased weight are matters of great importance in the practical manufacture and use of the device.

In Fig. 2 I have shown the device applied to a leaded joint, the construction being precisely similar to that shown in Fig. 1, save that the packing-recesses in the rings are not made larger in diameter than the coupling and are made of less depth, as shown, the packing-rings projecting a considerable distance from the recesses and impinging against the lead packings of the joint.

What I claim, and desire to secure by Letters Patent, is—

1. In a repair device for leaky joints, a clamping-ring formed of sections having overlapping end portions, said overlapping portions being provided with strengthening-webs, substantially as described.

2. In a repair device for leaky joints, a clamping-ring formed of sections having overlapping end portions, each of said overlapping portions of each section being provided with a strengthening-web adjacent to its inner edge and a strengthening-web adjacent to its outer edge, substantially as described.

3. In a repair device for leaky joints, a lamping-ring formed in sections having overlapping end portions provided with bolt-holes therein, said overlapping portions of one section being provided with projections eccentric to said bolt-holes, and the overlapping portions of the other section being provided with apertures adapted to be engaged by said projections, for temporarily securing the sections together, substantially as described.

4. In a repair device for leaky joints a clamping-ring formed in sections having overlapping end portions, each section being cored out intermediate its ends, forming inner and outer walls and having radially-disposed webs connecting said walls, each overlapping end portion of each section having strengthening-webs, forming continuations of said inner and outer walls, substantially as described.

In testimony whereof I affix my signature in presence of two witnesses.

SOLOMON R. DRESSER.

Witnesses:
G. H. WHITAKER,
L. P. WHITAKER.